United States Patent [19]

Emanuelson et al.

[11] Patent Number: 4,523,168

[45] Date of Patent: Jun. 11, 1985

[54] ELECTROMAGNET

[75] Inventors: Roy M. Emanuelson, Reading; David P. Lebet, Ipswich, both of Mass.

[73] Assignee: Scanditronix Inc., Essex, Mass.

[21] Appl. No.: 583,785

[22] Filed: Feb. 29, 1984

Related U.S. Application Data

[63] Continuation of Ser. No. 424,643, Sep. 27, 1982, abandoned.

[51] Int. Cl.³ .............................................. H01F 7/00
[52] U.S. Cl. ..................................... 335/296; 335/299
[58] Field of Search ............... 335/209, 210, 211, 213, 335/296, 297, 299

[56] References Cited

U.S. PATENT DOCUMENTS 3,174,084  3/1965  Westendorp et al. ............. 335/210
3,246,147  4/1966  Skala ............................. 335/210 X Primary Examiner—George Harris
Attorney, Agent, or Firm—Cushman, Darby & Cushman

[57] ABSTRACT

An electromagnet for producing a transverse field that is spatially periodic along an axis. Two coaxial interjacent helical poles are positioned on the axis. Electric current paths and magnetically conducting members connect to induce a magnetic flux of opposite polarity in the respective helical poles. A return path of magnetic material connects to all the conducting members thereby to complete the magnetic circuit. The resulting magnetic circuit produces a transverse field diametrically across the air gap formed by the two helical poles and this field is spatially periodic along the axis.

10 Claims, 5 Drawing Figures

ELECTROMAGNET

This is a continuation of application Ser. No. 424,643, filed 9/27/82 now abandoned.

BACKGROUND OF THE INVENTION

This invention generally relates to free electron lasers and more specifically to magnets used for producing free electron laser emission from relativistic electrons.

Nearly 30 years ago reports were made of spontaneous and stimulated emissions of electromagnetic radiation in a spatially periodic transverse magnetic field (i.e., undulator radiation). More recently, electrons at relativistic energies have been passed through spatially periodic transverse magnetic fields to obtain undulator emissions in a much broader range to include free electron emission at about 3 microns. Research is being carried out to develop free electron lasers for operation over a wide range of wavelengths from the far infrared (400 microns) through the visible and ultraviolet light spectra and into the X-ray wavelengths.

As this research has continued, investigations into the application for such lasers have also been undertaken. There are a wide variety of applications emerging, especially in the studies of solid state excitations. For example, laser light in the range from 10,000 microns to 1 micron can be used in the study of cyclotron resonance in narrow band and other semiconductors, and of plasmons and Mosfets. Superconductive lattice, interface, Mosfet 2-D states, shallow impurity states, phonons, and molecular rotational transitions for chemisorbed and absorbed surfaces are other areas of study where laser light can be utilized advantageously.

The major elements of a free electron laser include an accelerator for producing electrons at relativistic energies, an undulator magnet for producing the spatially periodic transverse magnetic field, and a beam transport system for directing the electrons, in a vacuum, from the accelerator through the undulator magnet. Equation 1 defines the peak wavelength of undulator radiation ($\lambda$) where $\tau_\mu$ is the period of the undulator, $\gamma$ is related to the energy of the electron according to equation 2, P is the transverse momentum imparted to the electron by the undulator by the spatially periodic field, and B is the amplitude of the undulator field.

From the foregoing it is apparent that the electromagnet for producing the spatially periodic magnetic field must have several charcteristics. Periodicity of the magnet must be constant. The amplitude of the field also must be constant. Moreover, the magnet must have a relatively large bore to minimize optical cavity losses. However, increasing the bore causes the free electron laser gain to decrease. Moreover, the magnet motive force requirements must also be increased and this requires, an increase in the power to the electromagnet.

In the prior art a number of magnets have produced spatially periodic fields. In some, used especially at very short wavelengths, permanent magnets or discreet electromagnets are positioned along a bore in order to provide the spatially periodic fields. In other applications it has been proposed to make a field by winding a two-conductor coil in a helix. With this approach, equation 4 provides a reasonable approximation of the total current in the coil that is required to produce the field. There is no iron in this proposed magnet, and the term "a" defines the effective radius of the coil. In a practical application, the effective radius of the coil lies approximately at the midpoint of the coil taken in a radial direction. In one particular application where the cavity diameter was to be approximately 12 cm in the field and the axis was to be 500 gauss with a 20 cm undulator wavelength, the power requirement for producing the field was approximately 800 kw.

The addition of a helical iron pole with the helical coil and a return path of magnetic materials was also reviewed. Analysis of this structure showed a reduction of the power by a factor of 8. However, magnet would be complex to manufacture. Even at this lower power, conventional regulated dc power supplies were not readily available.

SUMMARY

Therefore, it is an object of this invention to provide an electromagnet for producing a transverse spatially periodic magnetic field that is especially adapted for use in free electron lasers.

Another object of this invention is to provide a simplified electromagnet for producing a spatially periodic transverse magnetic field.

Yet another object of this invention is to provide an electromagnet for producing a spatially periodic transverse magnetic field that is relatively simple to construct.

An electromagnet constructed in accordanace with this invention produces a transverse magnetic field that is spatially periodic along an axis. It comprises two magnetic helical poles that are coaxial with the axis and that are interjacent. A magnetic flux return surrounds and is spaced from the pole pieces. Magnetic feeder poles interconnect the magnet return and each of the first and second poles. Current conducting means are disposed about the feeder poles for inducing a magnetic field in the feeder poles which in turn energizes the two helical poles to produce north and south poles respectively. When energized, the electromagnet produces a field in a plane normal to the axis and this transverse field is spatially periodic along the axis in accordance with the disposition and configuration of the two helical poles.

This invention is pointed out particularly in the appended claims. The above and further objects and advantages of this invention may be better understood by referring to the detailed description taken in conjunction with the accompanying drawings.

DESCRIPTION OF AN ILLUSTRATIVE EMBODIMENT

Figure 1:
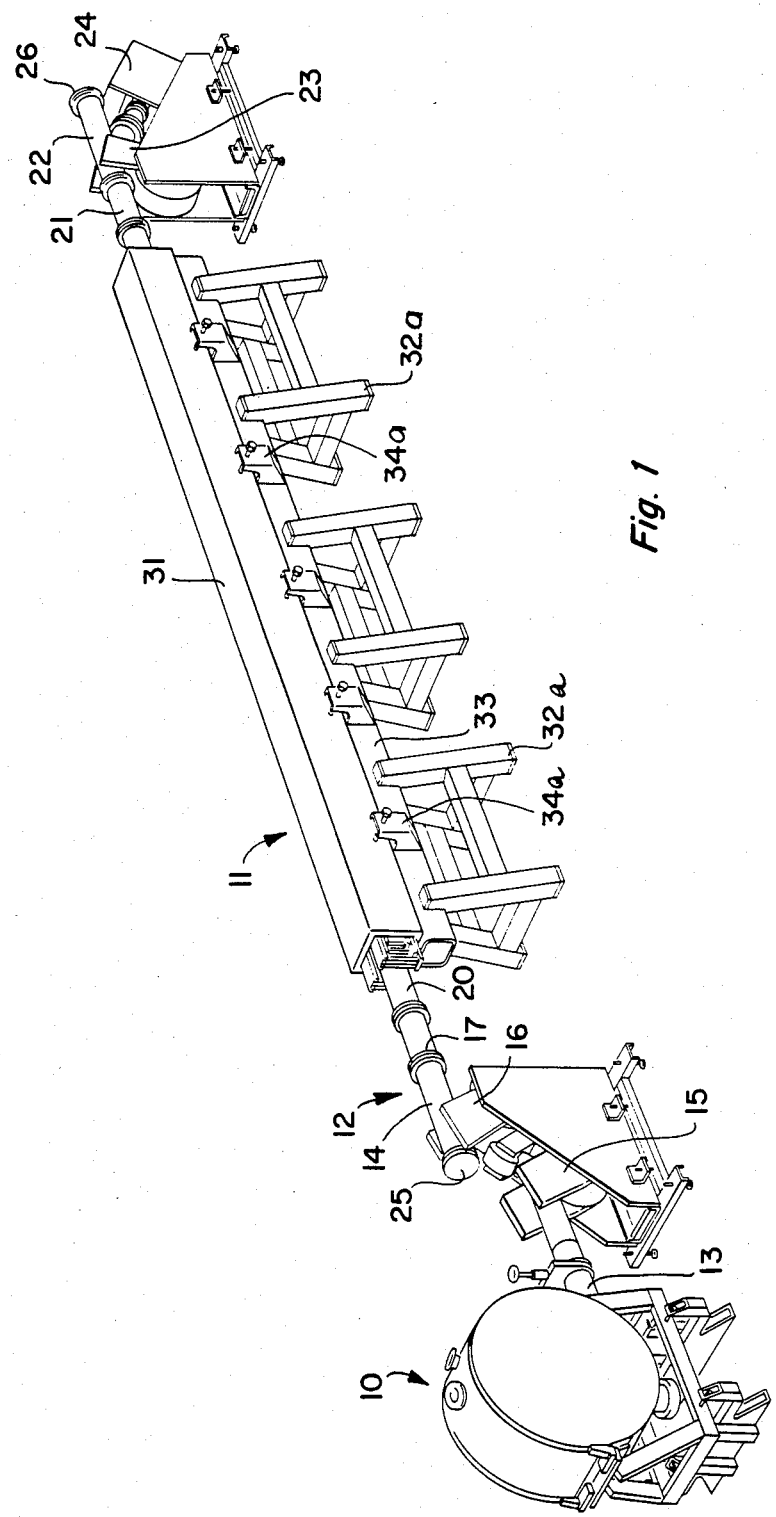
FIG. 1 is an iosmetric view of a free electron laser that utilizes an electromagnet constructed in accordance with this invention.

FIG. 1 depicts an embodiment of a free electron laser system that is adaptive for producing laser light in the far infrared, region particularly wavelengths from 100 to 400 microns. Basically, this free electron laser comprises an electron accelerator for accelerating electrons into the relativistic energies called a microtron 10, an undulator magnet 11 constructed in accordance with this invention and a beam transport system 12 that conveys the electrons in a vacuum from the microtron 10 through the undulator magnet 11.

More specifically, the microtron 10 contains an rf cavity positioned at the outer circumference of a gap in a circular magnet. The cavity is located in a vacuum chamber and accelerates electrons from a hot cathode source. As the electrons leave the cavity with an incremental energy increase, the transverse magnetic field causes the electrons to move along a circular path that returns the electrons to the entrance of the rf cavity whereupon they are accelerated again. Thus the electrons undergo successive accelerations and define circular tracts of increasing radius until they reach an extraction radius whereupon they are extracted from the microtron through an extraction tube within a vacuum chamber 13. A microtron is characterized by a very narrow spectrum of energies in the final beam output and therefore has been selected for this application. However any other electron accelerator with high stability that can produce relativistic electrons could be used. Racetrack microtrons, linear accelerators and Van de Graaff generators are acceptable. In this particular embodiment a final electron energy of 10 to 20 Mev has been selected for the wavelength desired.

The beam transport system includes a series of vacuum chambers. A first vacuum chamber 14 is disposed in magnetic fields generated by a 45° bending magnet 15 and a 45° bending magnet 16. These two magnets produce a parallel offset in the beam in a vertical plane for reasons that will become apparent later. A short vacuum chamber 17 interconnects the downstream end of the vacuum chamber 16 with a vacuum chamber 20 that extends through the undulator magnet 11. Another short section 21 interconnects the vacuum chamber 20 and a vacuum chamber 22 that is disposed in a 45° non-dispersive bending magnet 23. The magnet 23 deflects the electrons exiting the magnet 11 into a beam dump 24 to dissipate them. The short sections 17 and 21 can be used for various beam diagnostic elements.

In this particular application, reflecting mirror assemblies are to be connected to flanges 25 and 26 so that the photons emitted during the spontaneous radiation in the magnetic field will be reflected between the mirrors through vacuum chambers 14, 17, 21 and 22. With this mode of operation the magnets 15 and 16 provide the necessary parallel offset to allow the light to be extracted from the laser cavity at flange 25 and the magnet 23 provides the deflection of the electrons so that the light can be isolated when it strikes the mirror at flange 26. Other offsetting schemes are also possible. For example, a bending magnet could be substituted for the bending magnets 15 and 16 that would bend the beam in a horizontal plane. Moreover, if light emission were not to be reflected within the cavity, the beam from the extraction to the microtron 13 could be directed straight through the magnet 11 with the elimination of the bending magnets 15 and 16. Further in other configurations focussing, steering and bending magnets could also be used.

Now referring to the electromagnet 11, a flux return yoke 31 in the form of a rectangular frame serves as a mechanical structural support member to provide rigidity to the magnet. The yoke 31 is mounted on a series of stands 32 that carry a supporting beam structures 33a. Adjustment means, such as indicated at 34a, provide variable positioning of the magnet for alignment purposes.

Figure 2:
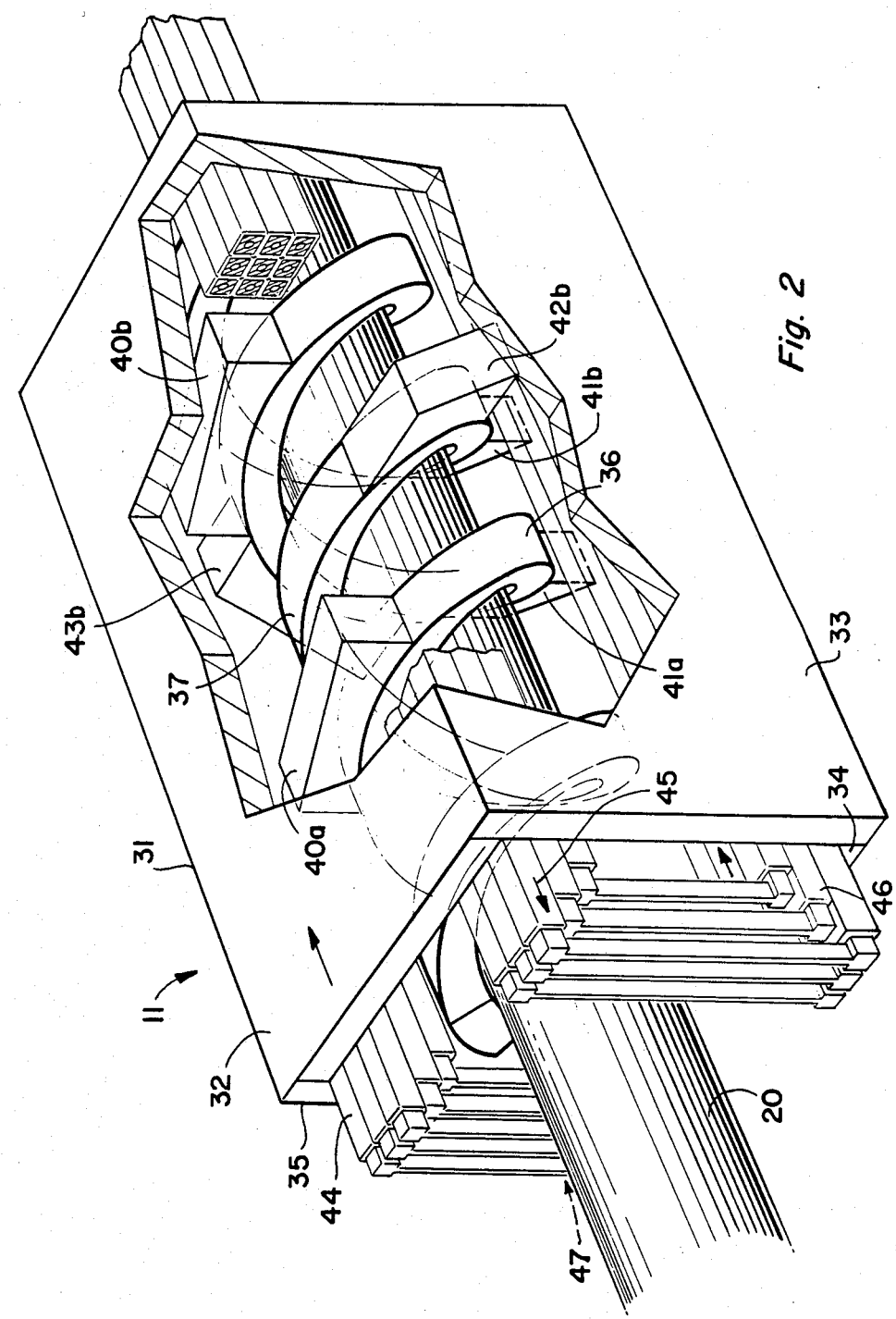
FIG. 2 is an isometric view of a portion of an electromagnet constructed in accordance with this invention.

Now referring to FIG. 2, the yoke 31 of the electromagnet 11 is formed of four steel plates 32, 33, 34, and 35. As shown in FIG. 2 these plates form a box beam. Inside and spaced from the yoke 31 are two helical poles 36 and 37. In this particular application, the poles have a pitch that corresponds to the pitch of the spatially periodic transverse field which the magnet is to produce. For an infrared laser in the 100 to 400 micron wavelength utilizing electron energies from 10 to 20 MeV, the pitch is 20 cm. The helical poles are interjacent and are coaxial. They are disposed outside the vacuum chamber 20, that is constructed of nonmagnetic material. Each pole is supported within the yoke 31 by a series of feeder poles or saddles. One set of feeder poles, 40a, 40b . . . , interconnects the top plate 32 and the helical pole 36. Feeder poles 41a, 41b . . . interconnect the bottom plate 34 and the pole 36. Similarly feeder poles 42a, 42b . . . and 43a, 43b . . . interconnect side plates 33 and 35 respectively to the second helical pole 37. Each of the feeder poles has a rectangular cross section and is skewed to be coextensive with a significant portion of the outer circumferential surface of the respective pole piece. This construction then defines a magnetic circuit of highly permeable materials in the yoke return 31, feeder poles 40 through 43 and the helical poles 34 and 36.

A number of corner sections are produced between the feeder poles, the helical poles and the yoke. The return yoke 31 has dimensions with respect to the helical poles 36 and 37 and the feeder poles 40 and 43 that allows straight conductors to be passed along the entire length of the magnet through these corner sections and these conductors are then interconnected at the ends to form an energizing coil.

Specifically, as shown in FIG. 2 this coil contains four conductor sections 44, 45, 46, and 47. Each section is made up of a number of insulated straight conductors. The number and size of the conductors depends upon the required energizing current and the need for air or water-cooling of the conductors. The specific configuration of the coils is not important. However, the direction of the currents in each of the conductor sections is important. Specifically, if a conventional current indicates that current is flowing to the right in conductor portion 44 it must flow to the left in conductors section 47 and 45 and to the right in conductor section 46. With this configuration, the flux induced in feeder poles 40 and 41 will cause a magnetic potential corresponding to a north pole at the helical pole 36 and the parallel feature of the feeder poles connecting to the helical coil 46 insures that the pole has a constant magnetic potential. Likewise the magnetic flux induced in feeder poles 42 and 43 is such that the connected helical pole 37 becomes a south pole again with a constant magnetic flux along the length of the poles.

Figure 3:
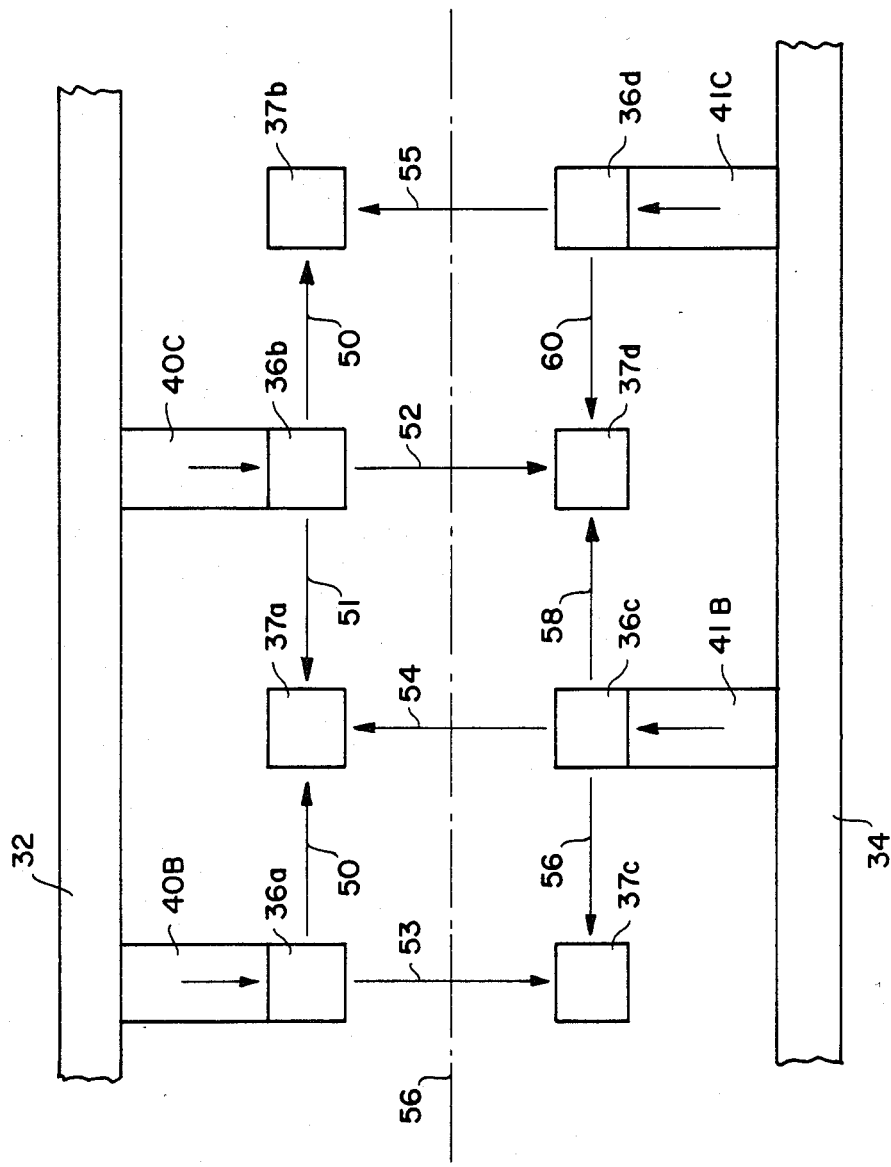
FIG. 3 is a schematic diagram of an electromagnet constructed in accordance with this invention that is useful for understanding of the fields produced in the magnet.

To understand the spatial periodicity of the transverse field, reference is made to FIG. 3 that depicts a magnet in a schematic view. Four feeder poles 40b and 40c and 41b and 41c interconnect the upper and lower plates 32 and 34 with the helix 36. Only four isolated cross sections of the helix 36, and helix section 36a, 36b, 36c and 36d as shown. Likewise, in this plane only isolated sections 37a, 37b, 37c, 37d of the second helix are shown, and none of the feeder poles 42a, 42b... or 43a, 43b... exist. As previously indicated, when the coil is energized, the feeder poles have a magnetic flux induced in them shown by the respective arrows thus making the helical pole 36 a north pole. The flux lines in the air gaps are also shown in this drawing. In this plane there are three air gaps associated with each helical pole. For example, looking at isolated sections 36b and 37b represented by reference number 50, there is represented by arrow a flux 51 between isolated portions 36b and 37a, and a transverse flux represented by arrow 52 between isolated sections 36b and 37a. The transverse flux 52 is the flux of interest. Similarly, there are transverse fluxes represented by arrows 53, 54, and 55 between poles 36a and 37c, poles 37a and 36c, and 36a and 37b respectively. Thus, along an axis 56 the flux in the transverse direction is spatially periodic. In this particular figure the flux reversals are shown with arrows 52 and 53 being represented from north to south vertically downward and arrows 54 and 55 that depict flux reversals. This obviously is only a representation and other flux vectors are produced. Moreover, the flux in the transverse plane maybe relatively weak with respect to the leakage flux between adjacent areas of the magnet such as represented by arrows 50 and 51, depending upon the relative air gaps.

By extrapolation it will be apparent that at various positions along the axis there will be a transverse flux that can be represented as a transverse magnet vector. The magnitude of this vector at the axis 56 will be constant; however, the direction of the magnet vector will vary.

Figure 4:
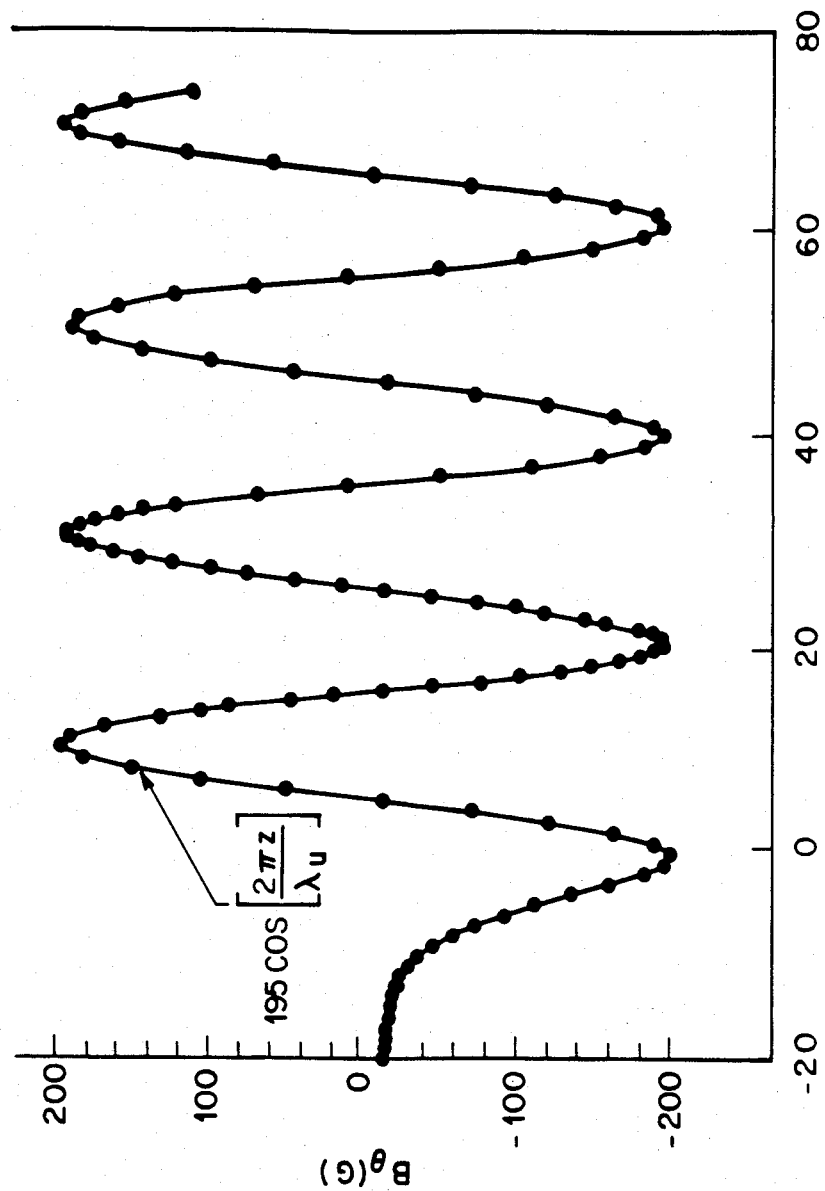
FIG. 4 is a graph that depicts the transverse magnetic field along the axis of an electromagnet constructed in accordance with this invention.
Figure 5:
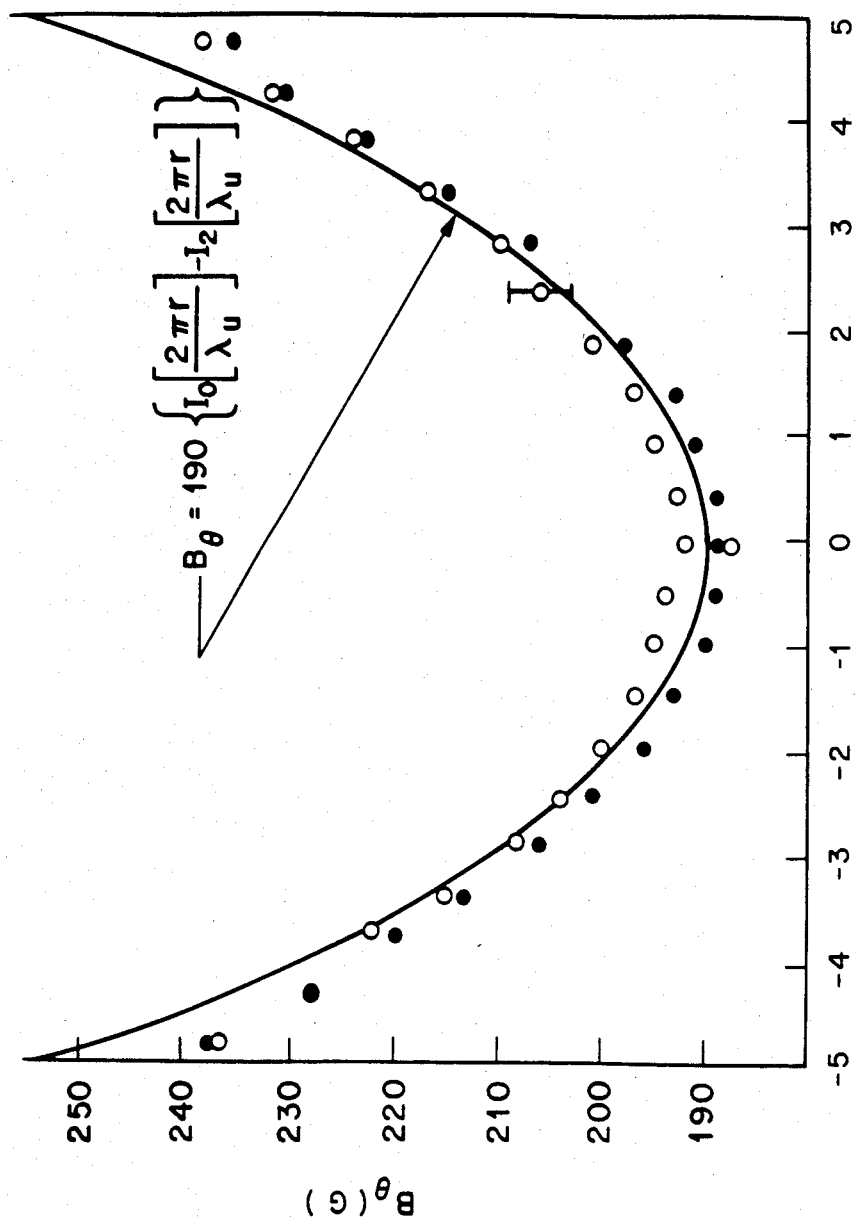
FIG. 5 is a graph that depicts the radial magnetic field in an electromagnet constructed in accordance with this invention.

This operation is demonstrated in FIG. 4 that represents the flux at the center line of the axis 56 in FIG. 3 over a series of periods defined by the helical poles 36 and 37. It is a sinusoidal waveshape that in this particular direction is represented by a cosine form. The sinusoidal nature of the waveshape therefore confirms the helical nature of the field. FIG. 5 represents the angular field as a function of the distance from the center line and corresponds to the Bessel function for a helical field given in radial coordinates over a significant portion of the radius. This is particularly true in the volume closely surrounding the radius which is the area of interaction between the electron beam and the magnetic field.

In operation the microtron in FIG. 1 produces high intensity pulses of electrons that are bunched into rf cycles or micropulses, of the pulse. For example a 15 microsecond pulse at 3000 MH produces a series of 45,000 rf pulses. During each of these rf pulses the electrons from the gun will be bunched into a small phase space so that the 15 microsecond pulse actually comprises a sequence of 45,000 micropulses of electrons. Assuming that the helical magnet has a length of approximatey 10 meters (50 revolutions of the helix at a 20 cm pitch) and further that the overall distance between mirrors connected to the flanges 25 and 26 is approximately 15 m, the time for the electrons to pass from a point approximating the flange 25 to the flange 26 and back to the flange 25 is approximately 100 ns, and this corresponds to approximately 300 rf pulses. The distance between the mirrors is adjusted to phase the reflections so that successive pulses form series of bunches that interact with previously stimulated emissions thereby to amplify the light output. If the mirror 26 is highly reflective and the mirror 25 has some transmission, then laser light at the appropriate wavelength should be passed through the mirror connected at flange 25 and conducted in vacuum to a working station.

From the foregoing description it will be apparent that the disclosed construction of an electromagnet formed in accordance with this invention provides several advantages. First, the magnet is relatively easy to manufacture. The helical poles are readily formed from conventional pipe and can be cut with sufficient precision to provide a uniform periodicity of the transverse field. Moreover, the helixes can be cut at either fixed or variable pitch as required by a particular application. Feeder poles are simple to manaufacture and the interconnection to the yoke becomes a relatively simple procedure. Finally the conductors are straight. In terms of a 20 cm pitch, a reduction of nearly ⅓ of the conductor length was achieved over the two conductor, helically wound coil. Given a bore diameter of approximately 12.5 cm, the power requirement for one embodiment was reduced from 100 kW for bifilar wound coil and material poles to 20 kW. Even lower powers could be achieved with larger sized conductors. At these power levels conventional dc power supplies can provide the necessary current. In this particular embodiment, a 1000 A, 20 V power supply energizes a series current path throughout the conductors. The series current path has the additional advantage in providing a uniform current distribution throughout the current paths without need for any balancing controls as might be required if parallel current paths from different sources could be produced. Thus the electromagnet produces the required spatially periodic transverse magnetic field and is relatively easy to manufacture and can be constructed with conventional power supplies.

The foregoing description is of a specific embodiment. However, there are many modifications such as the variable pitch helical poles and other configurations of the return path and conductor paths that could be implemented to produce an electromagnet having the desired features. Therefore it is the object of the appended claims to cover all such variations and modifications as come with the true spirit and scope of the claims.

What is claimed as new and desired to be secured by Letters Patent of the United States is:

1. An electromagnet comprising:
   (a) first and second interjacent open helical magnet pole means coaxial with a longitudinal axis,
   (b) magnet yoke means surrounding and spaced from said pole means,
   (c) first and second angularly displaced magnetic coupling means interconnecting said magnet yoke means and said first and second pole means respectively thereby to define a high permeability magnetic path with said first and second pole means and said magnet yoke means, and
   (d) means for inducing magnetic flux in said coupling means thereby producing a magnetic field having a direction that is angularly displaced along the axis in accordance with the pitch of said helical magnetic poles.

2. An electromagnet as recited in claim 1 wherein said helical poles means are formed with a fixed helical pitch.

3. An electromagnet as recited in claim 1 wherein said helical pole means are formed with a variable pitch.

4. An electromagnet as recited in claim 1 where each of said helical pole means comprises an iron pole of rectangular cross section.

5. An electromagnet as recited in claim 1 where each of said coupling means comprises spaced discrete plates that each contain surfaces that are coextensive with portions of said magnet yoke means and with portions of said respective pole means.

6. An electromagnet as recited in claim 5 wherein said means producing flux comprises straight conductors disposed on opposite sides of said coupling means.

7. An electromagnet as recited in claim 6 wherein said first coupling means includes first and second sets of discrete plates that engage said first pole means and that are angularly skewed with respect to the axis.

8. An electromagnet as recited in claim 7 wherein said flux inducing means comprises a polarity of current paths about the peripheries of said discrete plates.

9. An electromagnet as recited in claim 7 wherein said magnet yoke means comprises a box beam and each of said discrete plates has a planar end surface for engaging one internal surface of said box beam and one cylindrical surface for engaging the outer surface area of one of said helical poles.

10. An electromagnet for producing, along a magnet axis, a magnetic field having a direction that is angularly displaced along the magnet axis, said electromagnet comprising:
(a) first and second interjacent pole means offset from the magnet axis and positioned along the magnet axis in an open helical pattern for defining first and second magnet poles and an air gap across the magnet axis,
(b) magnet pole means interconnecting said pole means for providing therewith a highly permeable magnet path, and
(c) means for inducing magnetic flux in said pole means for producing magnetic field across the air gap.

* * * * *